United States Patent
Kwok et al.

(10) Patent No.: US 12,192,195 B2
(45) Date of Patent: Jan. 7, 2025

(54) SYSTEMS UTILIZING SECURE OFFLINE LIMITED-USE TOKENS FOR TEMPORARY ELECTRONIC ACTIVITY AUTHENTICATION AND METHODS OF USE THEREOF

(71) Applicant: Capital One Services, LLC, McLean, VA (US)

(72) Inventors: Jennifer Kwok, New Rochelle, NY (US); Viraj Chaudhary, McLean, VA (US); Abdelkader M'hamed Benkreira, New York, NY (US)

(73) Assignee: Capital One Services, LLC, McLean, VA (US)

( * ) Notice: Subject to any disclaimer, the term of this patent is extended or adjusted under 35 U.S.C. 154(b) by 524 days.

(21) Appl. No.: 17/090,733

(22) Filed: Nov. 5, 2020

(65) Prior Publication Data

US 2022/0141215 A1    May 5, 2022

(51) Int. Cl.
*H04L 9/40* (2022.01)

(52) U.S. Cl.
CPC ........ *H04L 63/0853* (2013.01); *H04L 63/107* (2013.01)

(58) Field of Classification Search
CPC .. H04L 63/107; H04L 63/108; H04L 63/0853
See application file for complete search history.

(56) References Cited

U.S. PATENT DOCUMENTS

| | | | |
|---|---|---|---|
| 8,386,376 B2 | 2/2013 | Gomes et al. | |
| 8,689,294 B1* | 4/2014 | Thakur | H04L 63/08 726/16 |
| 9,203,821 B2* | 12/2015 | Robison | H04L 63/08 |
| 9,271,110 B1* | 2/2016 | Fultz | H04W 4/029 |
| 9,444,805 B1* | 9/2016 | Saylor | H04L 63/08 |
| 10,134,026 B1* | 11/2018 | Koeppel | G06Q 20/321 |

(Continued)

OTHER PUBLICATIONS

Jayasinghe, Danushka, et al. "Extending emv tokenised payments to offline-environments." 2016 IEEE Trustcom/BigDataSE/ISPA. IEEE, 2016. (Year: 2016).*

(Continued)

*Primary Examiner* — Kari L Schmidt

(74) *Attorney, Agent, or Firm* — Greenberg Traurig, LLP

(57) ABSTRACT

Systems and methods of the present disclosure enable the generation and use of secure offline tokens for account activity authentication. A processor receives an activity record including activity details including an entity identifier. The processor determines a flight booking associated with the activity record when the entity identifier includes an airline, and determines flight data associated with the flight booking. The processor automatically generates an offline token associated with the user account, including account access restrictions. The account access restrictions include a token activation period that binds the offline token to a duration of the flight, and a token entity binding that binds the offline token to use with the airline for performing in-flight account activity requests. The processor automatically causes a computing device to download the offline token to enabling performing the in-flight account activity requests with the entity during the offline token activation period.

20 Claims, 9 Drawing Sheets

(56) References Cited

U.S. PATENT DOCUMENTS

| | | | |
|---|---|---|---|
| 10,360,545 B2* | 7/2019 | Lee | G06F 21/6227 |
| 10,531,239 B1* | 1/2020 | McCarty | H04W 4/029 |
| 10,706,414 B1* | 7/2020 | Lieberman | G06Q 20/4016 |
| 11,074,773 B1* | 7/2021 | Morris | B60L 53/66 |
| 11,107,066 B1* | 8/2021 | Maeng | G06Q 20/3226 |
| 11,282,310 B1* | 3/2022 | Charling | G07C 9/253 |
| 11,488,139 B2* | 11/2022 | Runyan | G06Q 20/325 |
| 11,620,586 B2* | 4/2023 | Stogo | G06Q 10/02 705/5 |
| 2006/0010206 A1* | 1/2006 | Apacible | G06F 15/163 709/205 |
| 2006/0064600 A1* | 3/2006 | Polichetti | G06F 21/31 713/183 |
| 2007/0198848 A1* | 8/2007 | Bjorn | G07C 9/28 713/186 |
| 2009/0119698 A1* | 5/2009 | Kuijlaars | G07C 9/28 340/5.8 |
| 2010/0010841 A1* | 1/2010 | Cooper | G06Q 30/06 705/5 |
| 2011/0238476 A1* | 9/2011 | Carr | H04W 4/029 705/14.1 |
| 2012/0025947 A1* | 2/2012 | Sinha | G07C 9/28 340/5.6 |
| 2012/0232782 A1* | 9/2012 | Sterkel | H04H 20/62 701/409 |
| 2014/0040139 A1 | 2/2014 | Brudnicki et al. | |
| 2015/0136848 A1* | 5/2015 | Lynch | G06Q 20/40 235/382 |
| 2015/0161597 A1 | 6/2015 | Subramanian et al. | |
| 2015/0371205 A1* | 12/2015 | Proud | G06Q 20/325 705/21 |
| 2017/0193505 A1* | 7/2017 | Erhart | G06Q 20/405 |
| 2018/0367307 A1* | 12/2018 | Ekberg | H04L 9/3213 |
| 2019/0289017 A1* | 9/2019 | Agarwal | H04L 9/12 |
| 2019/0347640 A1* | 11/2019 | Runyan | G06Q 20/385 |
| 2020/0162890 A1* | 5/2020 | Spencer | H04L 67/303 |
| 2020/0195656 A1* | 6/2020 | Marsh | H04L 63/107 |
| 2020/0211309 A1* | 7/2020 | Daniel | G07C 9/257 |
| 2021/0168455 A1* | 6/2021 | Campbell | H04W 12/03 |
| 2021/0352064 A1* | 11/2021 | Tsarfati | G06N 20/00 |
| 2022/0043931 A1* | 2/2022 | Pierce | H04W 12/06 |
| 2022/0138725 A1* | 5/2022 | Sneider | G06Q 20/326 705/41 |
| 2023/0394467 A1* | 12/2023 | Karemangingo | G06Q 20/1085 |
| 2024/0259622 A1* | 8/2024 | Watson | H04N 21/25891 |

OTHER PUBLICATIONS

Shrivastav, Pooja, and Aashita Srivastava. "Exploring the Dynamics and Implications of Offline Peer-to-Peer Payments." 2023 14th International Conference on Computing Communication and Networking Technologies (ICCCNT). IEEE, 2023. (Year: 2023).*

* cited by examiner

SYSTEMS UTILIZING SECURE OFFLINE LIMITED-USE TOKENS FOR TEMPORARY ELECTRONIC ACTIVITY AUTHENTICATION AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems, devices and components for secure offline tokens for temporary activity authentication and methods thereof.

BACKGROUND OF TECHNOLOGY

Authorizing user activities can often require the use of authorization credentials or account information such that a server may provide authorization. However, many situations exist where providing such information is inconvenient or undesirable, such as during travelling. While travelling, providing authentication for an activity opens a vector for security breaches and numerous inconveniences.

SUMMARY OF DESCRIBED SUBJECT MATTER

In some embodiments, the present disclosure provides an exemplary method that includes at least the following steps of receiving, by at least one processor, an activity record including activity details associated with an account activity request in a user account, where the activity details include an entity identifier; determining, by the at least one processor, a flight booking associated with the activity record when the entity identifier includes an airline; determining, by the at least one processor, flight data associated with the flight booking, the flight data including a flight departure time; automatically generating, by the at least one processor, a temporary offline token associated with the user account, where the temporary offline token includes account access restrictions, and where the account access restrictions include: a temporary offline token activation period associated with the temporary offline token being active during a flight based on the flight departure time, and a temporary offline token entity binding associated with the temporary offline token being bound to the airline for performing in-flight account activity requests with the airline during the temporary offline token activation period. The method further includes the step of automatically causing to download, by the at least one processor, the temporary offline token at a computing device to perform the in-flight account activity requests with the entity during the temporary offline token activation period.

In some embodiments, the present disclosure provides another exemplary method that includes at least the following steps of receiving, by at least one processor, an activity record including activity details associated with an account activity request in a user account, where the activity details include a flight number; determining, by the at least one processor, flight data associated with the flight number, the flight data including: i) a flight departure time indicator associated with a flight departure time, ii) a flight arrival time indicator associated a flight arrival time at a destination, and iii) an airline identifier identifying an airline operating a flight associated with the flight number; automatically generating, by the at least one processor, a temporary offline token associated with the user account, where the temporary offline token includes account access restrictions, and where the account access restrictions include a temporary offline token activation period associated with the temporary offline token being active during a flight based on the flight departure time and the flight arrival time. The method further includes steps to automatically causing to download, by the at least one processor, the temporary offline token at a computing device to perform in-flight account activity requests during the temporary offline token activation period.

In some embodiments, the present disclosure provides another exemplary system that includes at least the following components of at least one processor in communication with a user account. The at least one processor is configured to implement software instructions causing the at least one processor to perform steps to: receive an activity record including activity details associated with an account activity request in the user account, where the activity details include an entity identifier; determine a flight booking associated with the activity record when the entity identifier includes an airline; determine flight data associated with the flight booking, the flight data including a flight departure time; automatically generate a temporary offline token associated with the user account; where the temporary offline token includes account access restrictions; where the account access restrictions include: a temporary offline token activation period associated with the temporary offline token being active during a flight based on the flight departure time, and a temporary offline token entity binding associated with the temporary offline token being bound to the airline for performing in-flight account activity requests with the airline during the temporary offline token activation period; and automatically cause to download the temporary offline token at a computing device to perform the in-flight account activity requests with the entity during the temporary offline token activation period.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 9 illustrate systems and methods of generating and issuing temporary security tokens for authorizing electronic activities. The following embodiments provide technical solutions and technical improvements that overcome technical problems, drawbacks and/or deficiencies in the technical fields involving electronic and online security, as well as user and/or user activity authentication. As explained in more detail, below, technical solutions and technical improvements herein include aspects of improved generation of authentication tokens through automated and dynamic means such that the tokens have parameters that are automatically set to authentic user activities for limited uses during limited times. Based on such technical features, further technical benefits become available to users and operators of these systems and methods. Moreover, various practical applications of the disclosed technology are also described, which provide further practical benefits to users and operators that are also new and useful improvements in the art.

Figure 1:
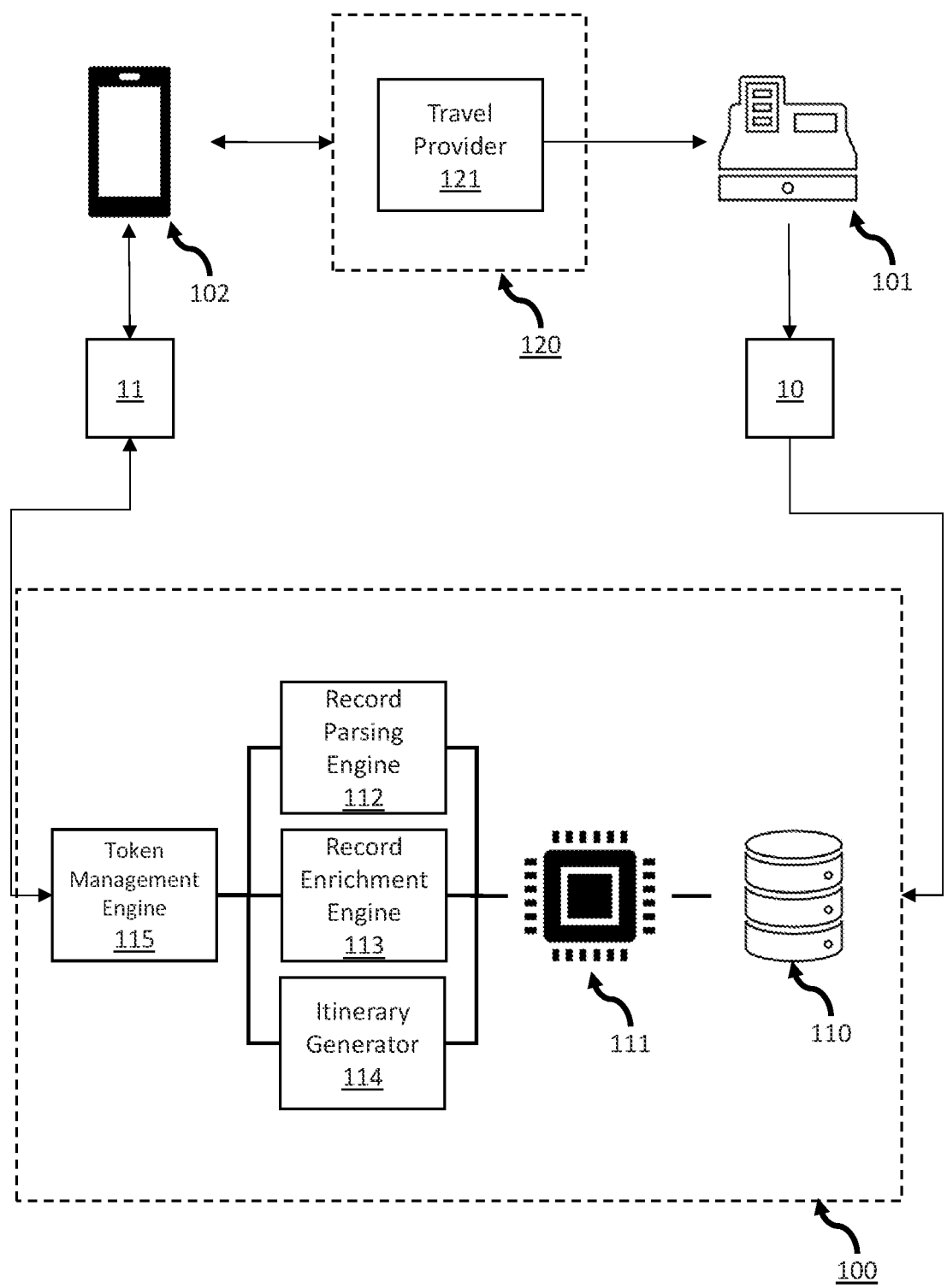
FIGS. 1-9 show one or more schematic flow diagrams, certain computer-based architectures, and/or screenshots of various specialized graphical user interfaces which are illustrative of some exemplary aspects of at least some embodiments of the present disclosure.

FIG. 1 is a block diagram of an exemplary system for issuance and management of secure offline tokens for activity authorization in accordance with one or more embodiments of the present disclosure.

In some embodiments, user authentication can employ digital tokens that verify the identity user, verify the validity of a user account associated with the user, or perform other authentication activities that allow the user to participate in certain electronic activities. However, typically, tokens are either one-time use tokens, thus requiring cumbersome processes to obtain a token for each instance of electronic activities, or the tokens are permanent, resulting in the convenience of reusability but resulting in compromises to user account security because the longer or more times a token is used, the more likely it is to be attacked by bad actors. Accordingly, an account management system 100 according to at least some embodiments of the present disclosure may solve these issues by automatically generating limited-use tokens that can last beyond a single use, but are not permanently associated with a user's account. Moreover, the account management system 100 may issue such limited-use tokens with authentication parameter(s) that are generated based on inferred (e.g., predicted) future activity characteristic(s), thus anticipating the scenarios in which the limited-use tokens may be used, and restricting the use to those scenarios.

Thus, in some embodiments, the account management system 100 may receive activity records 10 and use the activity records to generate secure offline limited-use tokens 11 for user with a user device 102. In some embodiments, the activity records 10 may include electronic activities recorded, requested, and/or authorized by a third-party computing system 101. For example, in some embodiments, the third-party computing system 101 is a travel-related activity system, such as a booking site, an airline website, a train website, a rideshare service, a hotel or home rental service, a car rental agency or car-sharing service, a travel reviews and/or travel guide website, a point-of-sale device or network associated with a travel agency, airport, airline, train, or other travel provider, among other entities and associated systems.

User engagement with such systems and/or services may indicate upcoming travel plans. Travelling may increase vectors for account breaches (e.g., through misplacing credentials, sharing personal information, etc.). As a result, the user account management system 100 may beneficially automatically create the secure offline limited-use tokens 11 of the present disclosure to be customized for the travel details based on information in the activity records 10 related to the travel-related electronic activities via the third-party computing system 101. In some embodiments, the activity records 10 may be in the form of website browsing or software application navigation activities, such as, e.g., link selections, commenting and posting activities, user ratings, among other activities collected, e.g., via browser cookies, a browser extension, an application or browser software-development kit (SDK), or other tool. In some embodiments, the activity records 10 may also or alternatively include transaction activities, such as, e.g., credit card, debit card, or gift card purchases and purchase requests, bank transfers, among other transactions and transaction requests initiated with the third-party computing system 101.

In some embodiments, the activity records 10 include details regarding the recorded electronic activities. For example, a time of the recorded activity, a date of the recorded activity, an entity associated with the third-party computing system 101, a user account associated with the authentication of the activity, a subject of the activity (e.g., the travel provider 121 associated with the travel related electronic activities, or an entity associated with a web site on which the activities were performed, among other subjects and combinations thereof), travel related details such as a booking number, a location of the subject or of the booking, a duration, among other details and combinations thereof. In some embodiments, where the activity record 10 is a transaction authorization or request, the recorded details may include, e.g., a date of the transaction, a merchant category code associated with the third-party computing system 101 or travel provider 121 or both, a booking number, among others.

In some embodiments, the activity records 10 and associated details are received by the account management system 100 and stored in a user account of an account management database 110. In some embodiments, the account management database 110 may include a data storage solution for maintaining activity histories for each user account of the account management system 100, such as, e.g., transaction histories for each financial account of each account holder with a financial institution, such as a bank, credit union, credit company, or other financial institution.

In some embodiments, the data storage solution of the account database 110 may include, e.g., a suitable non-transitory memory or storage solutions for maintaining electronic data representing the activity histories for each account. For example, the data storage solution may include database technology such as, e.g., a centralized or distributed database, cloud storage platform, decentralized system, server or server system, among other storage systems. In some embodiments, the data storage solution may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof.

In some embodiments, upon reception of the activity records 10, a processing circuitry 111 may be programmed with software to examine the activity records 10 and identify the user account or user identifier associated with the activity records 10. For example, the processing circuitry 111 may use data fields of the activity records 10 that record the user account or user identifier. Based on the identified user account or user identifier, the processing circuitry 111 may cause the account database 110 to store the activity record 10 in the associated user account. Thus, the processing circuitry 111 and account database 110 may produce activity histories for each user account based on the received activity records 10.

In some embodiments, the processing circuitry 111 may include one or more processing devices, including any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processing device may include data-processing capacity provided by the microprocessor. In some embodiments, the microprocessor may include memory, processing, interface resources, controllers, and counters. In some embodiments, the microprocessor may also include one or more programs stored in memory. If an embodiment uses a hardware logic circuit, the logic circuit generally includes a logical structure that operates the account database 110, a record parsing engine 112, a record enrichment engine 113, an itinerary generator 114 and a token management engine 115, among other components, engines, systems and devices of the account management system 100.

In some embodiments, each of the record parsing engine 112, the record enrichment engine 113, the itinerary generator 114 and the token management engine 115 may include computer engines for parsing activity records, enriching the activity record data, generating an itinerary from the enriched data, and generating and managing secure offline tokens, respectively. As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the activity records 10, before or after being stored in the associated user account, may extract data from the activity records 10 and parse the data to identify travel details. In some embodiments, the activity records 10 include structured data, for example, a data table, array, tuple, or other data structure having multiple data fields. In some embodiments, each data field is assigned to a particular type of data, similar, for example, to ISO 8583 transaction messages, or other messaging standing.

In some embodiments, record parsing engine 112 is configured to extract data from travel booking related-data fields of the activity records 10 that are determinative or indicative of whether or not a user has booked travel. For example, a data field may be assigned to indicating an entity type associated with the third-party computing system 101, the travel provider 121, or both. For example, where the activity records 10 are transaction records, a data field for merchant category code (MCC) may be present that can be used to infer a travel booking. The record parsing engine 112 is configured to extract the data from the travel booking-related data fields and match the data to known data indicative of a travel booking. For example, where the data field is the MCC, the record parsing engine 112 may match the MCC to a travel related category, such as, e.g., an airline, hotels, car rentals, or other category.

In some embodiments, the record parsing engine 112 may infer a travel booking based on matching the data to a library of booking indicators (e.g., the MCC indicative of, e.g., airlines, hotels, car rentals, etc.). However, in some embodiments, the record parsing engine 112 may use one or more data fields of the activity records 10 to infer a travel book using machine learning algorithms, such as, e.g., a classification algorithm. For example, in some embodiments, the record parsing engine 112 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the record parsing engine 112 may include trained model parameters based on training datasets of the activity records 10 stored in the account management database 110. For example, historical activity records that are known to be associated with travel bookings may be labeled with as such and used to a classification model using a suitable optimization function.

Whether the travel booking is identified by matching data elements to a library of travel booking related data, or by using a machine learning model, the activity record having the indication of a travel booking may be identified and marked as indicating the travel booking. In some embodiments, the activity record may be flagged with a travel booking indicator. For example, the record parsing engine 112 may set a flag, e.g., in a new data field of the activity record or in metadata of the activity record, or by another suitable mechanism for setting a flag. In some embodiments, the activity record indicating the travel booking may alternatively or additionally be stored in a travel booking memory location, or by another suitable technique for identifying the activity record as indicating a travel booking. For example, the activity record may be put into a cache or buffer for quick and efficient access by, e.g., the record enrichment engine 113 and/or itinerary generator 114, or into a databased location or folder in the account management database 110 specific to activity records that indicate a travel booking.

In some embodiments, the indication of a travel booking may then be utilized by the record enrichment engine 113 to access the associated activity records 10 and provide enriched data. In some embodiments, the data enrichment engine 113 may be configured to ingest activity records 10 having the travel booking indication. For example, the data enrichment engine 113 may automatically ingest files in a cache or buffer where the record parsing engine 112 stores the activity records 10 indicating a travel booking. As another example, the record enrichment engine 113 may retrieve or receive the activity records 10 having the travel booking indicator from, e.g., the account management database 110 using, e.g., a suitable application programming interface (API) request, messaging protocol (e.g., publication-subscribe, or other suitable automated messaging protocol), or database query.

In some embodiments, upon ingesting the activity records 10, the data enrichment engine 113 may enrich the data in the data fields of the activity records 10 with additional travel booking-related details. For example, the data enrichment engine 113 may determine, e.g., booking dates, travel destination, departure date or time or both, travel provider entity (e.g., airline, train company, bus company, or other travel provider), layovers or rest stops during travel, among other travel booking details.

In some embodiments, the data enrichment engine 113 may automatically determine the travel booking-related details using, e.g., a database of travel provider 121 data, web-scraping, and/or by another suitable data augmentation technique. However, in some embodiments, the data enrichment engine 113 may interface with external services to request or retrieve enhanced activity data including the travel booking-related details. For example, where the activity records 10 include transaction records, the data enrichment engine 113 may issue API request(s) to one or more enhanced merchant data services that provide enhanced transaction data via, e.g., public and/or private application programming interfaces (APIs).

In some embodiments, upon receiving enhanced activity data and travel booking-related details, the data enrichment engine 113 may generate a new travel booking record or update the activity records 10 with the travel booking-related details. For example, the activity records 10 may be appended with the travel booking-related details by adding travel data fields representing travel booking-related details, such as, e.g., the mode of transportation, the transportation or travel provider 121, departure and return dates and/or locations, stops or layovers, among other travel booking-related details.

In some embodiments, the travel booking record may be communicated to the itinerary generator 114, stored in a booking record memory location (e.g., in a cache or buffer, or in the account management database 110), or by another suitable technique for identifying the travel booking record. For example, the travel booking record may be put into a cache or buffer for quick and efficient access by, e.g., the itinerary generator 114 and/or the token management engine 115, or into a databased location or folder in the account management database 110 specific to travel booking records.

In some embodiments, the itinerary generator 114 may ingest the travel booking record to use the travel booking-related details to automatically generate the booked itinerary of the activity records 10. For example, based on the mode of transportation, the transportation or travel provider 121, departure and return dates and/or locations, stops or layovers, among other travel booking-related details, the itinerary generator may generate an itinerary record. In some embodiments, the itinerary record includes data fields for each of the travel booking-related details such that a structured data file is produced for use by the token management engine 115.

In some embodiments, the itinerary record includes the travel booking-related details representing a travel itinerary 120. In some embodiments, the travel itinerary 120 includes the scope of each activity attribute recorded in the itinerary record. For example, itinerary record can represent the travel itinerary 120 including, e.g., times, dates, locations, and entities based on the travel booking-related details.

In some embodiments, the itinerary generator 114 may store the itinerary record in the account management database 110 linked to a user account associated with the itinerary record based on the user account of the corresponding activity record 10. Accordingly, the user account associated with the itinerary record can be updated with automated records of upcoming travel plans, rather than requiring user action to manually create travel notices. Moreover, the itinerary record includes the details of the travel booking for the user account, enabling the token management engine 115 to automatically create offline tokens bound to attributes of the itinerary based on the itinerary record.

In some embodiments, based on the travel booking-related details recorded in the itinerary record, the token management engine 115 may generate an offline limited-use token 11 for the user account. In some embodiments, the offline token limited-use 11 may include an account identifier and/or account activity authorization code that links the offline limited-use token 11 to the user account to authenticate account activities using the offline limited-use token 11. For example, the offline limited-use token 11 can include, e.g., a virtual card number the forms a temporary virtual transaction card similar to credit card or debit card. The virtual card number provides a sixteen digit account number that links to the user account to supplement the account with a temporary and disposable number that authenticates transactions with that user account while maintaining security of the authoritative or true account identifier or number. However, the offline limited-use token 11 can include any token that provides a disposable authenticator for activities with the user account, such as, e.g., online browsing, application activity, social media activity, and other online or virtual activities that benefit from user account authentication.

In some embodiments, the token management engine 115 may utilize the travel booking-related details and the data from the activity records 10 to create token bindings that bind the offline limited-use token 11 to certain types of activities, locations, times, entities, and other activity attributes. For example, the offline limited-use token 11 may be found to the travel provider 121 such that the offline limited-use token 11 would only work to authenticate new activity records 10 when used for activities with the travel provider 121. However, the offline limited-use token 11 can be bound to any combination of activity attributes of the travel itinerary 120.

In some embodiments, the bindings are determined based on the itinerary record to represent permissioned activities within the travel itinerary 120. In some embodiments, the permissioned activities may be restricted to the specific travel booking-related details representing the travel itinerary 120, for example, the travel provider 121 and no other entities, the dates determined for the travel booking, the locations (e.g., zip codes, airports, train or bus stations, hotels, car rental services, etc.) specified in the itinerary record, as well as other travel booking-related details. However, in some embodiments, the bindings can be expanded to include, e.g., dates within a predetermined range of the dates of the itinerary record (e.g., within about one day, two days, three days, one week, or other range), locations within a predetermined range of the location of the itinerary record (e.g., about five miles, ten miles, within the zip code, within a radius of one neighboring zip code or two neighboring zip codes, or other location range), entities within a predetermined category (e.g., car rentals, hotels, food, transportation, etc.), among other expansions to the specific details of the itinerary record.

In some embodiments, the offline limited-use token 11 is communicated to a computing device 102 associated with the user, and stored, e.g., in a memory or cache of the computing device 102. The user may then utilize the offline limited-use token 11 to authenticatee activities relative to the travel itinerary 120, including, e.g., with the travel provider 121 based on the bindings set by the token management engine 115. For example, when participating in activities relative to the travel itinerary 120, the user may load the offline limited-use token 11 and communicate the offline limited-use token 11 to authenticate the activities with third-parties. Communicating the offline limited-use token 11 can include an electronic communication via, e.g., Bluetooth™, WiFi, a local network, near-field communication (NFC) (e.g., tap-to-pay), or by other electronic communication techniques. However, communication the offline limited-use token 11 can be via a physical or manual process, such as, e.g., by showing or writing down an identifier associated with the offline limited-use token 11 (e.g., the virtual card number described above), or manually entering the identifier into a system of a third-party participating entity participating in the activity with the user.

In some embodiments, the offline limited-use token 11 may be verified by the third-parties with the account management system 100 using, e.g., a new activity record 10 or by any other suitable technique. The account management system 100 may then reference the offline limited-use token 11 with tokens linked to user accounts in the account management database 110. Where the offline limited-use token 11 is found in the account management database 110, the account management system 100 may authenticate the new activity record 10 to execute the activity for the user account linked to the offline limited-use token 11. Thus, the offline limited-use token 11 may be used within the travel itinerary 120 in the same or pre-existing processes for authenticating activities, such as, e.g., using point-of-sale or transaction authorization systems to perform transactions, as well as other activities, such as social media activities, customer ratings on, e.g., travel websites, among other activities.

In some embodiments, the offline limited-use token 11 may be temporary and expire upon the occurrence of specified conditions. For example, the offline limited-use token 11 may only be active when the computing device 102 is offline. Thus, the token management engine 115 may ping the computing device 102 upon the reception of the new activity records 10. Where the ping is returned, the token management engine 115 may determine that the computing device 102 is online (e.g., connected to the Internet), and therefore the new activity records 10 employing the offline limited-use token 11 should not be authenticated. However, where the ping is not returned, the computing device 102 is determined to be offline, and therefore, the offline limited-use token 11 may be active for authenticating activities, and the account management system 100 may authenticated the new activity records 10.

Therefore, in some embodiments, the offline limited-use token 11 may be used for in-flight transactions while travelling. Because the itinerary record specified the travel provider 121 (e.g., the airline), the offline limited-use token 11 may be bound to the airline and to the offline status of the computing device 102 to protect the associated user account from activity attempts when the user is not on the flight. Similarly, using the location details, the offline limited-use token 11 may be bound to, e.g., airports specified in the travel booking-related details, to allow authentication of activities with the offline limited-use token 11 only within airports within the travel itinerary 120.

In some embodiments, combinations of conditions can be employed to control the status of the offline tokens 11. For example, the offline limited-use token 11 can be activated when the computing device 102 arrives at the origin airport of the travel itinerary 120 based on the token management engine 115 receiving global positioning system (GPS) data from the computing device 102. The offline limited-use token 11 may then remain active for a duration until after a time period following the departure time of the flight of the travel itinerary 120. For example, the offline limited-use token 11 can be deactivated upon a duration of the booked flight after the departure time elapses, or after a number of days associated with the duration of the travel itinerary 120. Other conditions and combinations of conditions based on the itinerary record may be utilized to bind the active status of the offline tokens 11 to the travel itinerary 120.

Thus, the offline limited-use token 11 provides secure offline activity authentication to facilitate secure activity authentication while travelling without needing to use permanent authentication credentials.

Figure 2:
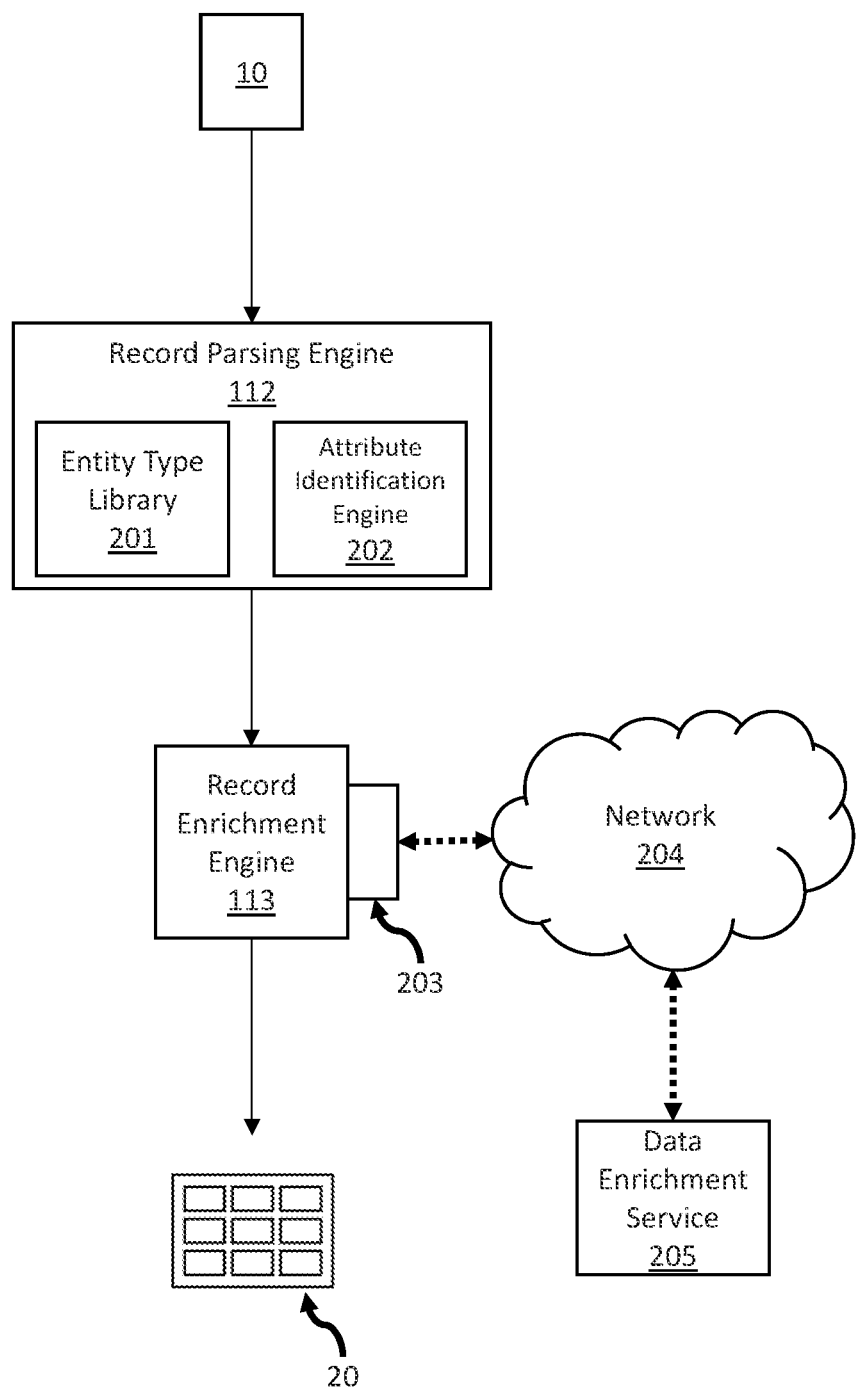

FIG. 2 is a block diagram of another exemplary data parsing and enrichment system for secure offline tokens for activity authorization in accordance with one or more embodiments of the present disclosure.

In some embodiments, the record parsing engine 112 utilize an entity type library 201 and an attribute identification engine 202 to determine whether an activity record 10 is associated with a travel booking. The record enrichment engine 113 may then interface with a data enrichment service 205 to determine the travel booking-related details 20.

In some embodiments, the record parsing engine 112 receives the activity record 10 and identifies the entity type recorded therein as described above. In some embodiments, the entity type includes, e.g., a merchant category code (MCC), a website category (e.g., social media, blog, message board, search engine, travel booking site, etc.), or other entity type categorization.

In some embodiments, the record parsing engine 112 utilizes a library of entities, the presence of which in the activity record 10 indicates a user has made a travel booking. For example, where a user leaves a customer rating on a known travel booking or travel social media site, the record parsing engine 112 may deduce that the activity record 10 indicates a travel booking. Similarly, where the activity record 10 includes a transaction with an entity having an airline MCC or hotel MCC, the record parsing engine 112 may deduce that the activity record 10 indicates a travel booking. The entity type library 201 can include a list of entity types that may indicate travel has been booked such that the record parsing engine 112 compares the entity type of the activity record 10 with each entity type catalogued in the entity type library 201 and determine that the activity record 10 is associated with a travel booking where a match is found.

In some embodiments, upon determining that the activity record 10 is associated with a travel booking, the record parsing engine 112 may utilized an attribute identification engine 202 to identify travel-related attributes of the activity record 10. In some embodiments, the activity record 10 may include a baseline of information from the activity record 10 and/or activity record message communicating the activity record 10. For example, for transaction activities, the associated card financial services entity (e.g., Visa, Mastercard, American Express, etc.) may include a baseline of information including, e.g., checked bags indications, flight indicators, rental car indicators, among others. In some embodiments, the attribute identification engine 202 identifies and extracts the baseline of information attributes associated with the baseline of information using, e.g., known data fields in the activity record 10 according to a messaging protocol, or by automated recognition of the baseline information using, e.g., machine learning techniques as described above.

In some embodiments, the baseline information attributes are provided to the record enrichment engine 113. In some embodiments, the record enrichment engine 113 utilized the baseline information attributes to determine enhanced travel booking details. To do so, the record enrichment engine 113 may interface with a data enrichment service 205 via an API 203. In some embodiments, the record enrichment engine 113 may send an API request using the API 203, the API request including the baseline information attributes. In some embodiments, the API request may also include a record identifier associated with a unique code or number identifying the activity record 10.

In some embodiments, the API 203 may communicate the API request with the baseline information attributes over a network 204 (e.g., the Internet, or other networking protocol) to the data enrichment service 205. In some embodiments, the data enrichment service 205 may include, e.g., the service that facilitates the activity record 10 messaging such as, e.g., a financial services company that enables transaction authorization request messages, such as Visa, Mastercard, American Express or other financial services. However, the service may be social media, email, messaging, or other service provider that structures and communicates the messages including the activity record 10. Such services may collect additional data regarding the generation and communication of the activity record 10 which is accessible via the API 203. Thus, the API request may trigger the data enrichment service 205 to return enriched data regarding the activity record 10, including, e.g., additional travel booking-related details, such as, e.g., hotel name, hotel address, hotel booking dates, hotel reservation number, social media check-in locations and dates, and travel provider information such as, flight number, origin airport, destination airport, lay-over airports, and similar details for, e.g., bus and train bookings, ferry bookings, car rentals, etc. However, in some embodiments, the data enrichment service 205 may include, e.g., additional social media data or messaging data indicative of the booking of travel bookings.

In some embodiments, the record enrichment engine 113 may utilize the baseline information attributes and the additional data to produce travel booking-related details 20. In some embodiments, the set of data items of the travel booking-related details 20 may be produced according to a predetermined format for each data item to ensure consistent and reliable travel itinerary determination. Accordingly, the record enrichment engine 113 may perform cleansing and normalization operations to ensure each data item conforms to the predetermined format.

In some embodiments, the travel booking-related details 20 include a set of data attributes representing each item of the baseline information and of the additional data provided by the data enrichment service 205. As such, the travel booking-related details 20 are representative of the information describing a travel itinerary deduced from the activity record 10.

Figure 3:
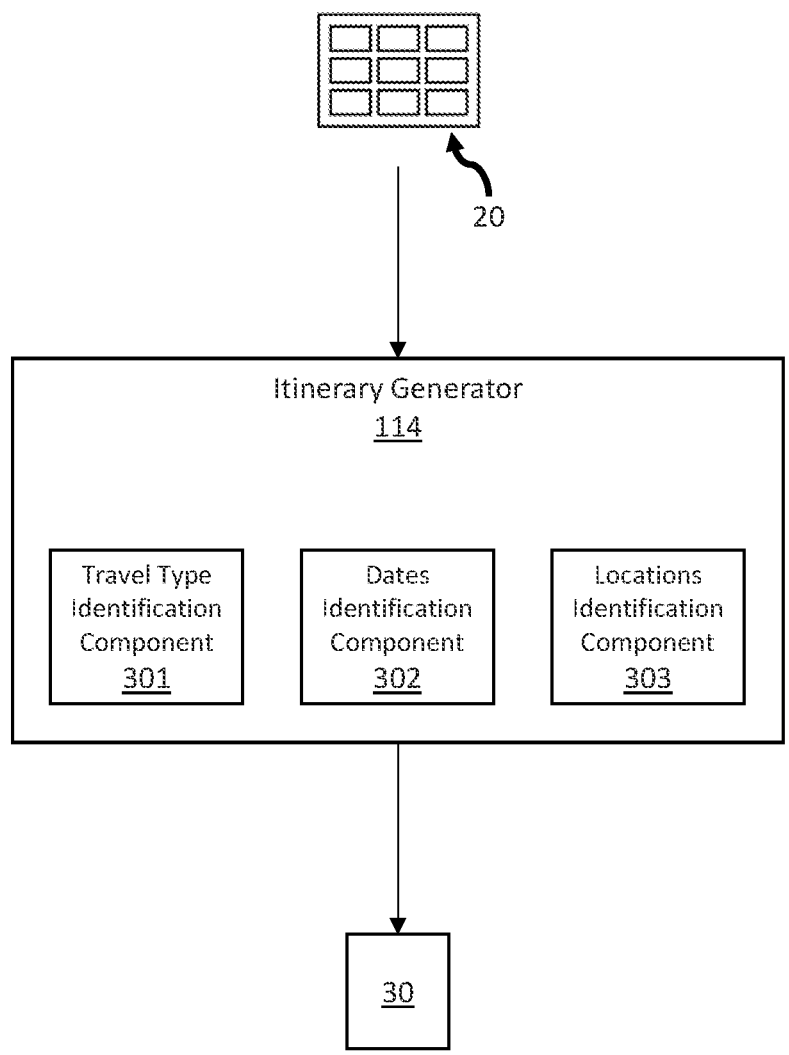

FIG. 3 is a block diagram of another exemplary system for automatic trip itinerary extraction and identification for secure offline tokens for activity authorization in accordance with one or more embodiments of the present disclosure.

In some embodiments, the itinerary generator 114 utilizes the travel booking-related details 20 to generate an itinerary record 30 that represents an inferred travel itinerary according to the type of travel booked, the dates of the travel, and the locations of the travel. Accordingly, the itinerary generator 114 may utilize a travel type identification component 301, a dates identification component 302 and a location identification component 303.

In some embodiments, the travel type identification component 301 may automatically determine the travel type, such as the mode of transportation based on the travel booking-related details 20. For example, as described above, the baseline information may include an indicator that an activity record 10 is associated with a flight booking or a car rental. Similarly, the travel booking-related details 20 may include indications of a train, bus or ferry booking based on either the baseline information of the enhanced data.

However, in some embodiments, the travel booking-related details 20 may not include an explicit indication of the travel type. Accordingly, the travel type identification component 301 may be configured to deduce the mode of transportation for other data of the travel booking-related details 20. Thus, the travel type identification component 301 may examine set of data within the travel booking-related details 20 that may be indicative of travel type, such as, e.g., entity type, travel type indicators, entity name or identification, entity location, among others.

For example, where the travel booking-related details 20 include an entity identifier or entity type associated with or related to a particular mode of transportation, the travel type may be determined at the particular mode of transportation. For example, where the travel booking-related details 20 indicates that the activity of the activity record 10 occurred with an airline, an airport, an online flight booking service, or other entity or entity type that is associated with flight purchases, the travel type identification component 301 may determine that the travel booking-related details 20 indicates a flight booking.

Similarly, where the entity location occurs outside of a predetermined radius from the user or from the activity, the travel booking-related details 20 may determine that a train or flight has been booked. For example, where the location is beyond, e.g., 100 miles, 200 miles, 300 miles, 400 miles or 500 miles, or other suitable distance from the user and/or the location of the activity, the travel type identification component 301 may determine that the travel is unlikely to be by a car or bus.

In some embodiments, the travel type identification component 301 may employ the travel booking-related details 20 to infer the travel type. However, in some embodiments, the travel type identification component 301 may also employ a start and end data, and a travel location or travel locations as determined by the date identification component 302 and locations identification component 303, respectively.

In some embodiments, the travel booking-related details 20 may omit a start date or end date for the travel booking. However, utilizing the travel booking-related details 20, the dates identification component 302 may generate an itinerary period including a start and end date for which the offline limited-use token 11 may be active. In some embodiments, the itinerary period may be inferred using, e.g., a booking or reservation date. Where the travel-booking-related details 20 omit such a date, the date identification component 302 may utilize, e.g., a hotel reservation identifier or, e.g., flight number, or other similar booking identifier, to retrieve a reservation date. For example, the date identification component 302 interface with, e.g., the associated hotel or airline system, or perform web searches, to identify dates of the booking. For example, flight numbers may be used to find the time, date and origin of a flight.

In some embodiments, using the date of the booking, the date identification component 302 may determine a length of a trip. For example, the date identification component 302 may be configured to provide itinerary dates for the mode of travel to the destination of the travel booking, for example, for the flight, or train ride. Accordingly, using the transportation booking number (e.g., flight number, etc.), the date identification component 302 may look up via web search the duration of the flight and set the itinerary period as the period between the flight take-off and the duration of the flight.

In some embodiments, where the travel booking-related details 20 relate to a hotel booking or car rental booking, the date identification component 302 may interface with the systems or databases of the hotel or car rental service to request (e.g., via API request) the length of the reservation. However, in some embodiments, the date identification component 302 may alternatively or additionally request user selection of an itinerary period.

Similarly, the location identification component 303 may determine or infer one or more locations to which the user may be travelling based on the travel booking-related details 20. In some embodiments, the location may be employed to determine geographic areas for which the offline token may be active.

In some embodiments, for train and airline bookings, similar to the dates, the locations associated with the number may be searchable on the Internet. Accordingly, the location identification component 303 may perform a web search to identify the destination of the travel booking to determine the location. For hotel and car rental bookings, the location identification component 303 may utilize a location of the hotel or car rental service. However, where the hotel or car rental service is a chain with many locations, similar to the dates, the location identification component 303 may interface with the with the systems or databases of the hotel or car rental service to request (e.g., via API request) the location of the reservation. However, in some embodiments, the location identification component 303 may alternatively or additionally request user selection of the location of the travel booking.

In some embodiments, the itinerary generation engine 113 may generate an itinerary record 30 for binding the offline limited-use token 11 to the user's travel bookings. In some embodiments, the offline limited-use token 11 may be bound to merchants, locations and dates. Accordingly, the itinerary generation engine 113 may utilize the travel booking-related details 20, travel type, itinerary period and location to form the itinerary record 30. For example, the itinerary record 30 may include data attributes specifying the travel type, the entity identifier of the operator of the travel type (e.g., the airline, car rental service, train company, etc. as specified in the travel booking-related details 20), the itinerary period and the location. As such, the itinerary record 30 provides data attributes for forming the bindings for the offline limited-use token 11.

Figure 4:
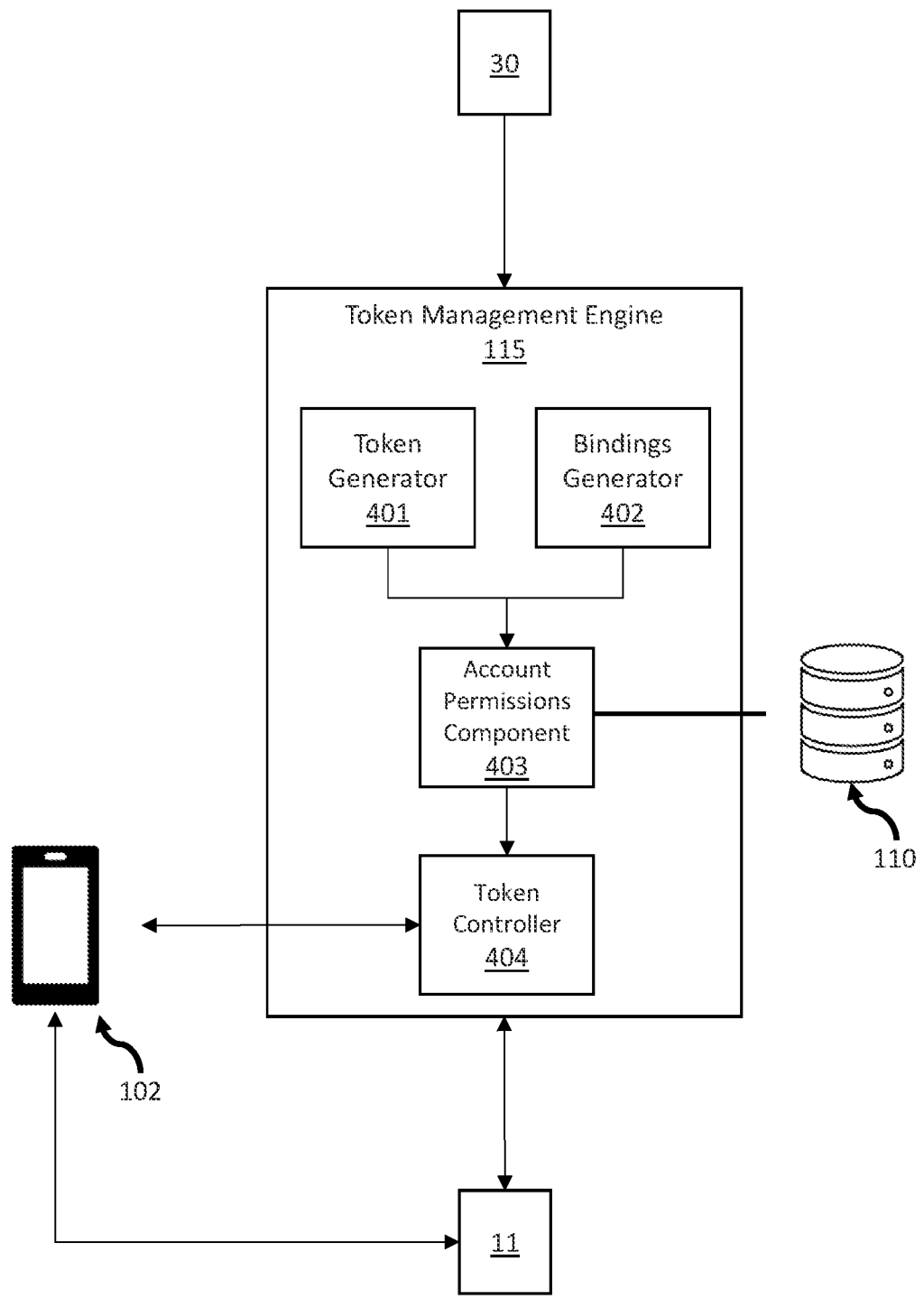

FIG. 4 is a block diagram of another exemplary token management engine in a system for secure offline tokens for activity authorization in accordance with one or more embodiments of the present disclosure.

In some embodiments, the itinerary record 30 may be employed by the token management engine 115 to generate one or more offline tokens 11 for use with authenticating activity and activity requests for a user account. To do so, the token management engine 115 may generate tokens with a token generator 401, generate token bindings with a bindings generator 402, and link the token and token bindings together with a user account in the account management database 110 to produce the authenticatable offline limited-use token 11. A token controller 404 may interface with a user computing device 102 on which the offline limited-use token 11 is stored in order to detect and control authentications based on the offline limited-use token 11 and the presence or absence of conditions corresponding to the bindings of the offline limited-use token 11.

In some embodiments, the token generator 401 may automatically generate one or more tokens for the user account upon the token management engine 115 receiving the itinerary record 30. In some embodiments, the token generator 401 generate digital token that include, e.g., a cryptographic key, a hash, a message authentication code (MAC), a password, a temporary or proxy account identifier (e.g., such as a virtual account number or virtual card number similar to the Capital One Virtual Card Number (VCN), or other suitable temporary or proxy account identifier), or other activity authentication credentials and combinations thereof.

In some embodiments, the token generator 401 generate the digital tokens randomly (e.g., based on a random number generator), algorithmically (e.g., sequentially for each token generated, based on a cryptographic hash, or by some other suitable algorithm), or by other suitable techniques and combinations thereof. However, to ensure that the digital tokens are unique, the token generator 401 may maintain a list or index of active offline tokens such that any duplicates can be deleted and re-generated. Alternatively or in addition, the token generator 401 employ a hash function based on, e.g., a true or permanent user account identifier, which is known to be unique, and thus generate unique digital tokens. Other suitable token generation techniques may be employed.

In some embodiments, the bindings generator 402 may also be triggered upon the receipt of the itinerary record 30 by the token management engine 115. In some embodiments, the binding generator 402 establishes conditions on which the digital token generated by the token generator 401 may be used to authenticate account activities and activity requests. These conditions are based on the itinerary record 30 such that the digital tokens may be restricted for use during the user's travel itinerary, or for portions thereof.

In some embodiments, the bindings generator 402 generate a binding based on the itinerary period of the itinerary record 30. In some embodiments, as described above, the itinerary period may establish the period of time that the user is expected to be on a given trip according to the travel booking-related details, or the itinerary period may establish the travelling time while using a particular mode of transportation, such as a flight, train ride, bus ride, or ferry ride. The itinerary period binding may serve as a condition for activation of the offline limited-use token 11 such that the offline limited-use token 11 may only be active as an authenticator for the user account during the itinerary period.

In some embodiments, the bindings generator 402 may expand the itinerary period to determine increase the period during which the offline token may be active. For example, to accommodate travel delays, changes in plans, or other reasons for extending a trip, the bindings generator 402 may add, e.g., about 5 percent, 10 percent, 20 percent, or other additional portion to the itinerary period to generate the itinerary binding.

Similarly, in some embodiments, the bindings generator 402 generate a binding based on the itinerary location of the itinerary record 30. In some embodiments, as described above, the itinerary location may establish the transportation stops and layovers (e.g., airports, rest stops, train stations, or other stops), and/or destinations to be visited that the user is expected be present in according to the travel booking-related details. The location binding may serve as a condition for activation of the offline limited-use token 11 such that the offline limited-use token 11 may only be active as an authenticator for the user account while the user is in one of the specified locations of the itinerary record 30.

In some embodiments, the bindings generator 402 may expand the location to determine an increase the geographic area which the offline limited-use token 11 may be active. For example, to accommodate travel delays, changes in plans, transportation rerouting, or other reasons, the bindings generator 402 may add, e.g., about 5 percent, 10 percent, 20 percent, or other additional portion to the geographic area of the location to generate the location binding.

In some embodiments, where the itinerary record 30 relates to a travel booking for a flight or train ride, the bindings generator 402 may generate a binding conditioned on the operator of the flight or train such that the offline limited-use token 11 may only be active for use with the operator. For example, the bindings generator 402 may generate an entity binding including the airline of the flight specified in the itinerary record 30 such that the offline limited-use token 11 is bound to the airline for in-flight purchases. However, the bindings generator 402 can generate an entity binding for any entity specified in the itinerary record 30, such as, e.g., hotel, airline, train company, bus line, among others and combinations thereof.

In some embodiments, the bindings generator 402 may select a set of bindings to generate based on, e.g., the travel type (e.g., airline, car rental, train, etc.). Some bindings may be more appropriate or more desirable for certain types of travel. For example, an entity binding may be less useful where the travel booking is a car rental. Rather, the bindings generator 402 may generate location and/or itinerary period bindings when the entity type of the itinerary record 30 is a car rental service. In contrast, when the entity type of the itinerary record 30 is an airline with in-flight purchases, the entity binding may be most relevant, though location and itinerary period bindings may also be generated for when the travel includes one or more layovers. Thus, each travel type may include a set of pertinent bindings for the bindings generator 402 to generate.

However, in some embodiments, regardless of the travel type, the bindings generator 402 may generate or apply an offline binding. An offline binding provides a condition for token activation where the token may only be active when the user computing device on which the offline limited-use token 11 is stored is offline. For example, where the user computing device 102 may respond to a ping, the computing device 102 may be deemed online, thus deactivating the offline limited-use token 11, and activating the offline limited-use token 11 when the computer device 102 fails to respond to the ping.

In some embodiments, the bindings and the digital token may be linked to the user account in the account management database 110 to generate the offline limited-use token 11 using an account permissions component 403. In some embodiments, the user account is modified to enable account activity to be authorized by the offline limited-use token 11 rather than or in addition to the permanent or true account authorization token or identifier (e.g., a credit card number, bank account number or other identifier). Accordingly, in some embodiments, the account permissions component 403 may generate an account link that links the digital token to the user account. Thus, reference to the digital token links to the user account. To enforce the bindings for such linking, the account permissions component 403 may set account activity permissions with reference to the digital token according to the bindings generated by the bindings generator 402. Thus, activity-related messages regarding activities, such as activity records or activity authorization requests, that reference the digital token for authorization may be authorized or denied based on the conditions of the bindings.

In some embodiments, conditions for the bindings can be tested and actuated using the token controller 404. In some embodiments, the token controller 404 may be in communication with the computing device 102, e.g., via an application or web browser, to ping the computing device 102 for conditions pertinent to the bindings of the offline limited-use token 11. For example, the token controller 404 may ping the computing device 102 with requests for, e.g., device location, device online status, among others. Based on the computing device 102 response to the ping, including whether the computing device 102 responds at all, as well as the date and time of the activity-related messages and entities referenced in the activity-related messages, the token controller 404 may determine the existence of conditions that satisfy the bindings (e.g., location, itinerary period, entity, etc.) as described above. Where one or more conditions does not exist, the token controller 404 deactivates the offline limited-use token 11 such that the activity-related messages are not authenticated and the associated activity is denied. However, where all conditions are satisfied, the token controller 404 may activate the offline limited-use token 11 such that the activity is authenticated.

In some embodiments, the token controller 404 may also load the offline limited-use token 11 into the storage of the computing device 102, as well as remove the offline limited-use token 11 from the computing device 102. In some embodiments, the token controller 404 may be configured to remove the offline limited-use token 11 from the computing device 102 when the status switches from offline to online (e.g., when the user's flight lands and the user reconnects to the Internet). Similarly, when the itinerary period elapses, the token controller 404 may remove the offline limited-use token 11 from the computing device 102.

In some embodiments, the token controller 404 may load the offline limited-use token 11 to the computing device 102 upon the offline limited-use token 11 being generated and linked to the user account. The token controller 404 may then control activity authentication by activating and deactivating the offline limited-use token 11 based on the bindings. However, in some embodiments, the token controller 404 may load the offline limited-use token 11 to the computing device 102 upon the detection of a first activating condition. For example, computing device 102 location or itinerary period may be used to determine when the user is beginning the trip. For example, the computing device 102 responding to a token controller 404 ping with a location within a predetermined distance of the origin airport of a flight of the itinerary record 30 may trigger loading of the offline limited-use token 11. For example, where the computing device 102 returns a location within, e.g., about half a mile, 1 mile, 2 miles, 5 miles or other distance to the airport, the location may trigger the token controller 404 to load the offline limited-use token 11 to the computing device 102. Alternatively or in addition, the current date and time of the computing device 102 response to the token controller 404 ping being within the itinerary period binding may trigger the token controller 404 to load the offline limited-use token 11 to the computing device 102. Combinations conditions of the bindings may be used as first activating conditions to trigger the token controller 404 to load the offline limited-use token 11 into storage of the computing device 102.

Figure 5:
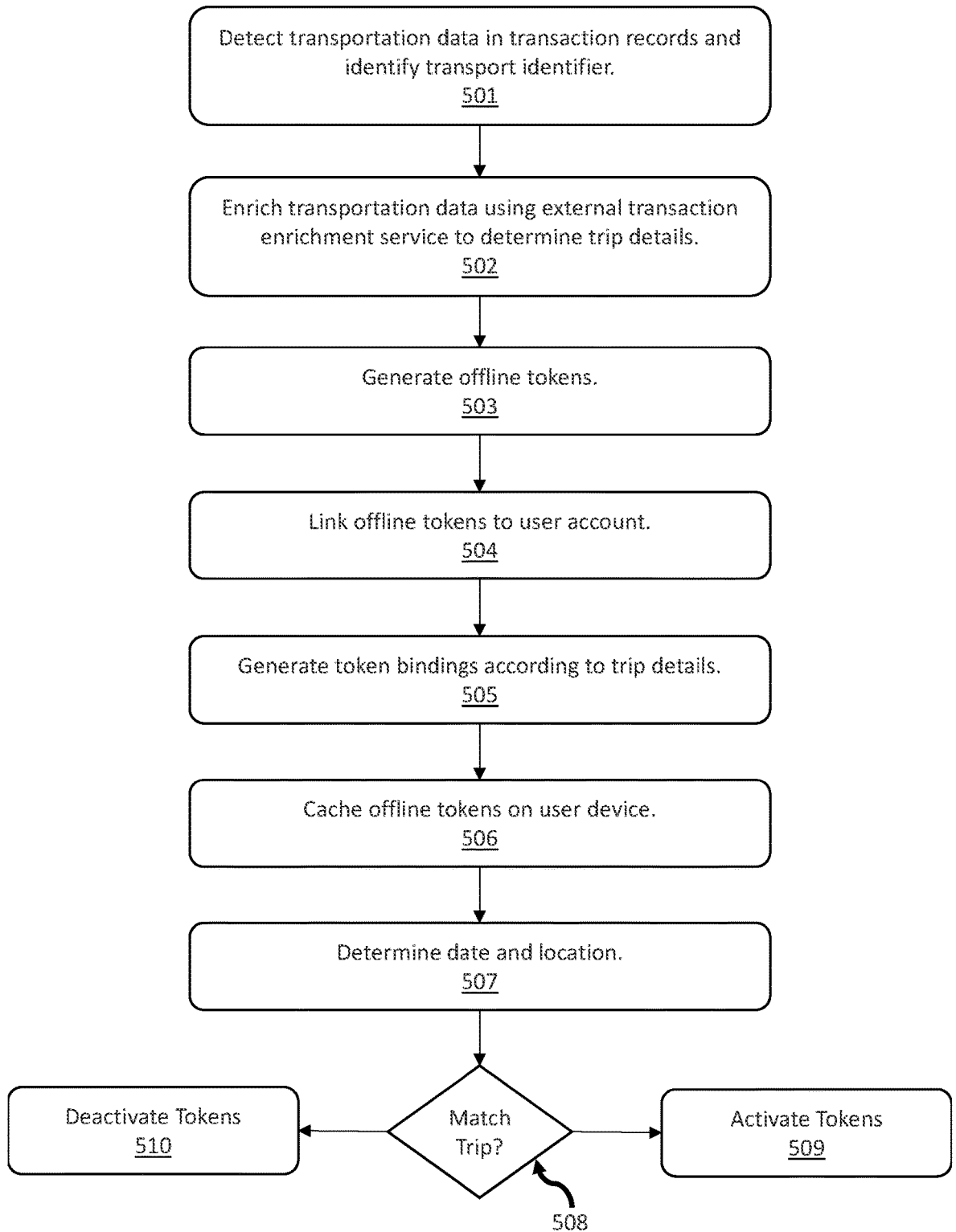

FIG. 5 illustrates a flowchart of an illustrative methodology for secure offline tokens for activity authorization in accordance with one or more embodiments of the present disclosure.

In some embodiments, a process for generating and implementing offline tokens for secure offline activity authorizations can include receiving an activity record including activity details associated a user account. In some embodiments, the account management system 100 at block 501 may detect transportation data in activity record, such as the travel booking-related details as described above. The account management system 100 may then identify in the transportation data a transport identifier associated with an entity that operate the mode of transport or identifier of the particular transport vehicle or booking.

In some embodiments, the activity details include an entity identifier. In some embodiments, the entity identifier may be associated with an airline and the flight data may include a flight departure time. The account management system 100 may identify each of the entity identifier, and flight departure time using the activity record.

In some embodiments, the account management system 100 at block 502 may enrich transportation data using an external data enrichment service to determine trip details. In some embodiments, to enrich the transportation data, the account management system 100 may receive enhanced activity details associated with the activity record from the external data enrichment service. In some embodiments, the enhanced activity details may include additional flight data comprising flight departure data associated with a flight departure airport. In some embodiments, the enhanced activity details may include additional flight data comprising flight departure data associated with a flight departure airport. In some embodiments, the enhanced activity details may include additional flight data comprising flight destination data associated with a flight destination airport. In some embodiments, the enhanced activity details may include additional flight data comprising layover data associated with one or more layover airports.

In some embodiments, the account management system 100 at block 503 may generate offline tokens based on the transportation data. In some embodiments, this may include automatically generating a temporary offline token associated with the user account.

In some embodiments, the account management system 100 at block 504 may link offline tokens to user account.

In some embodiments, the account management system 100 at block 505 may generate token bindings according to trip details. In some embodiments, the token bindings may define conditions for account access restrictions (e.g., the bindings as described above). In some embodiments, the account access restrictions, or bindings, may include a temporary offline token activation period according to the itinerary period of the transaction data and travel booking-related details. In some embodiments, the temporary offline token activation period is used to control the temporary offline token to be active during a flight based on the flight departure time. In some embodiments, the account access restrictions, or bindings, may include a temporary offline token entity binding. In some embodiments, the entity binding is used to control the temporary offline token to be bound to the airline for performing in-flight account activity requests with the airline during the temporary offline token activation period.

In some embodiments, the account management system 100 at block 506 may cache offline tokens on user device. For example, the account management system 100 may automatically cause the user's computing device to download into a storage or cache the temporary offline token at a computing device. By storing the temporary offline token, the computing device may form an offline pre-approved account activity device using the temporary offline token such that the computing device and/or the temporary offline token stored thereon may be used to perform the in-flight account activity requests with the entity during the temporary offline token activation period.

In some embodiments, the account management system 100 at block 507 may determine date and location, as well as other conditions associated with the bindings to determine whether account access restrictions are satisfied. For example, an activation state of the temporary offline token may be controlled or determined based on an online access setting of the computing device, such as access to the Internet.

In some embodiments, the account management system 100 at block 508 may determine whether the date and location, as well as the online access setting, match the account access restrictions. In some embodiments, where any one of the date, location, online access setting or other binding is satisfied, such as the computing device being in an offline state (e.g., without access to the Internet), the account management system 100 at block 509 may activate the offline tokens. However, in some embodiments, where any one of the date, location, online access setting or other binding is not satisfied, such as the computing device being in an online state (e.g., with access to the Internet), the account management system 100 at block 510 may deactivate the offline tokens.

Figure 6:
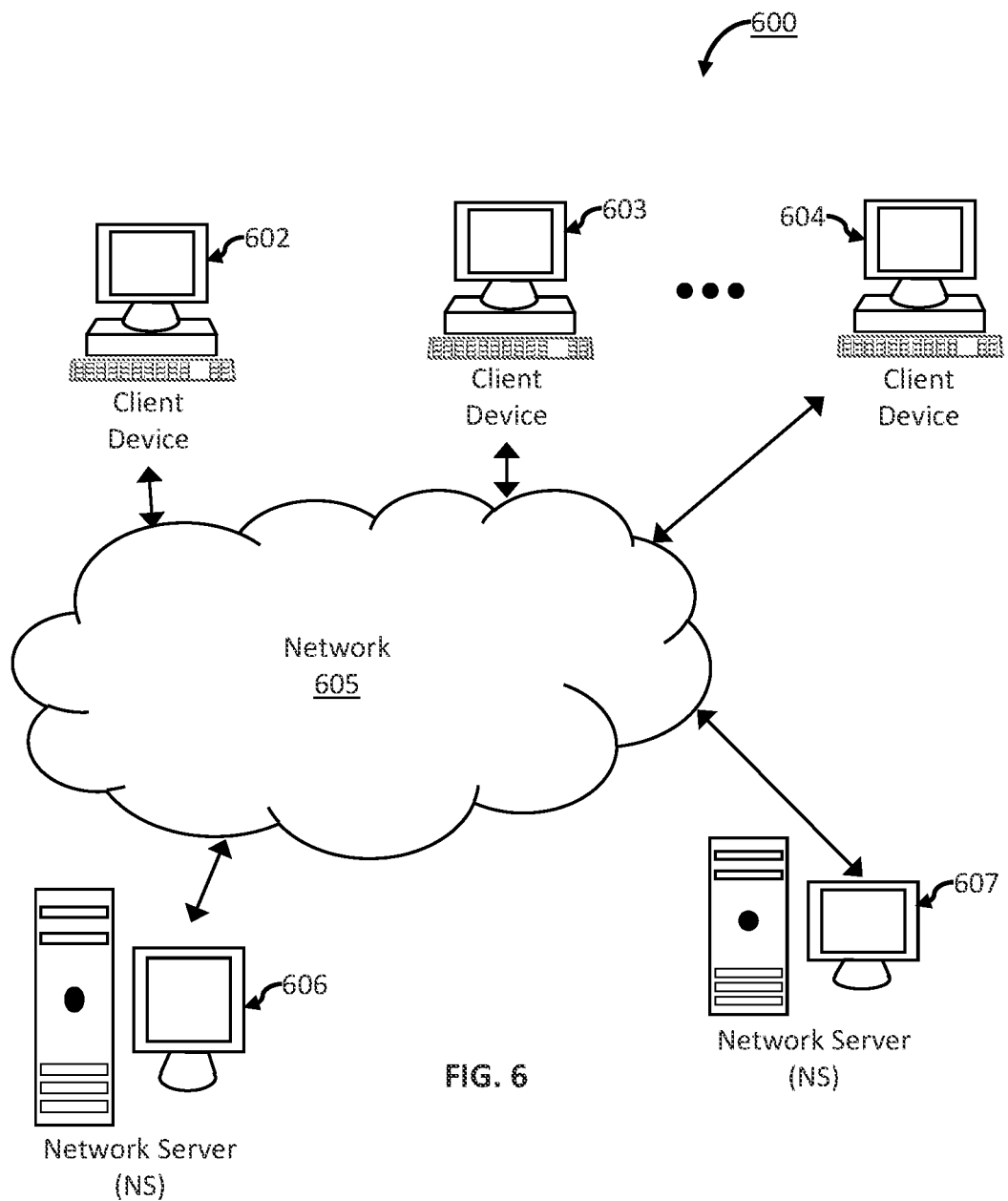

FIG. 6 depicts a block diagram of an exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 600 may be configured to manage a large number of members and concurrent transactions, as detailed herein. In some embodiments, the exemplary computer-based system and platform 600 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 6, members 602-604 (e.g., clients) of the exemplary computer-based system and platform 600 may include virtually any computing device capable of receiving and sending a message over a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 602-604 may include may run one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++ and/or other suitable programming language. In some embodiments, one or more member devices within member devices 602-604 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 605 may also include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but not limited to Microsoft Windows Server, Novell NetWare, or Linux. In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more exemplary computing member devices 602-604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
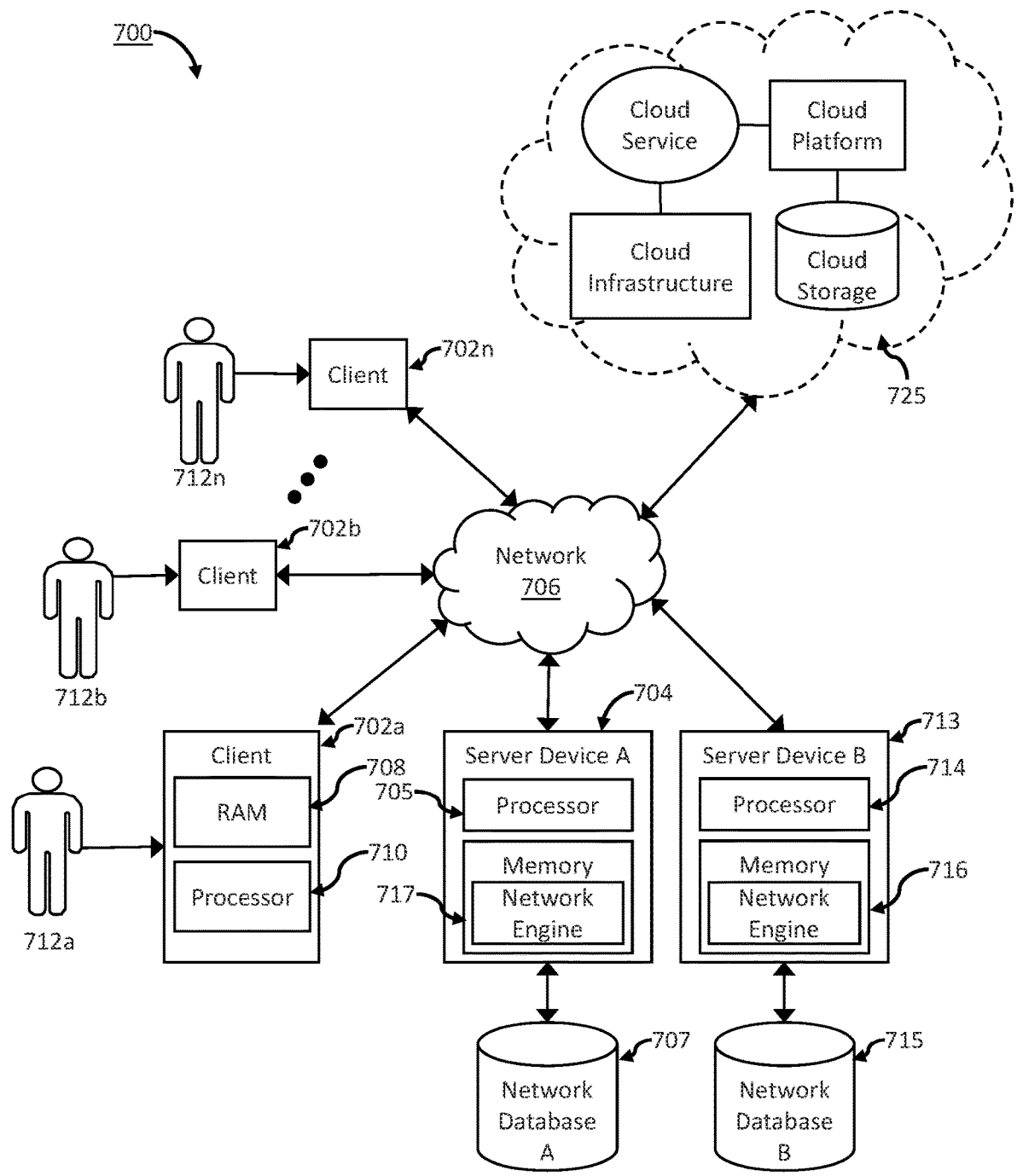

FIG. 7 depicts a block diagram of another exemplary computer-based system and platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 702a, 702b thru 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 702a through 702n may also comprise a number of external or internal devices such as a mouse, a CD-ROM, DVD, a physical or virtual keyboard, a display, or other input or output devices. In some embodiments, examples of member computing devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702a through 702n may be specifically programmed with one or more application programs in accordance with one or more principles/methodologies detailed herein. In some embodiments, member computing devices 702a through 702n may operate on any operating system capable of supporting a browser or browser-enabled application, such as Microsoft™ Windows™, and/or Linux. In some embodiments, member computing devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, users, 712a through 702n, may communicate over the exemplary network 706 with each other and/or with other systems and/or devices coupled to the network 706. As shown in FIG. 7, exemplary server devices 704 and 713 may be also coupled to the network 706. In some embodiments, one or more member computing devices 702a through 702n may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
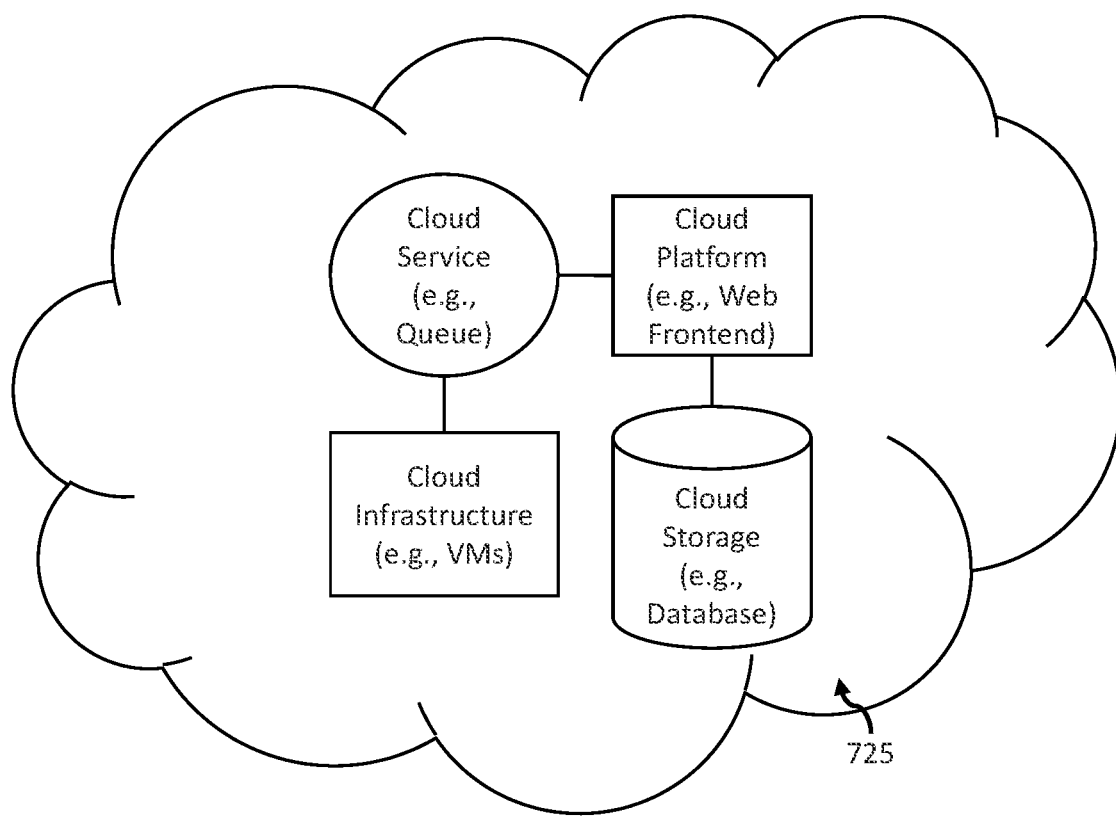
Figure 9:
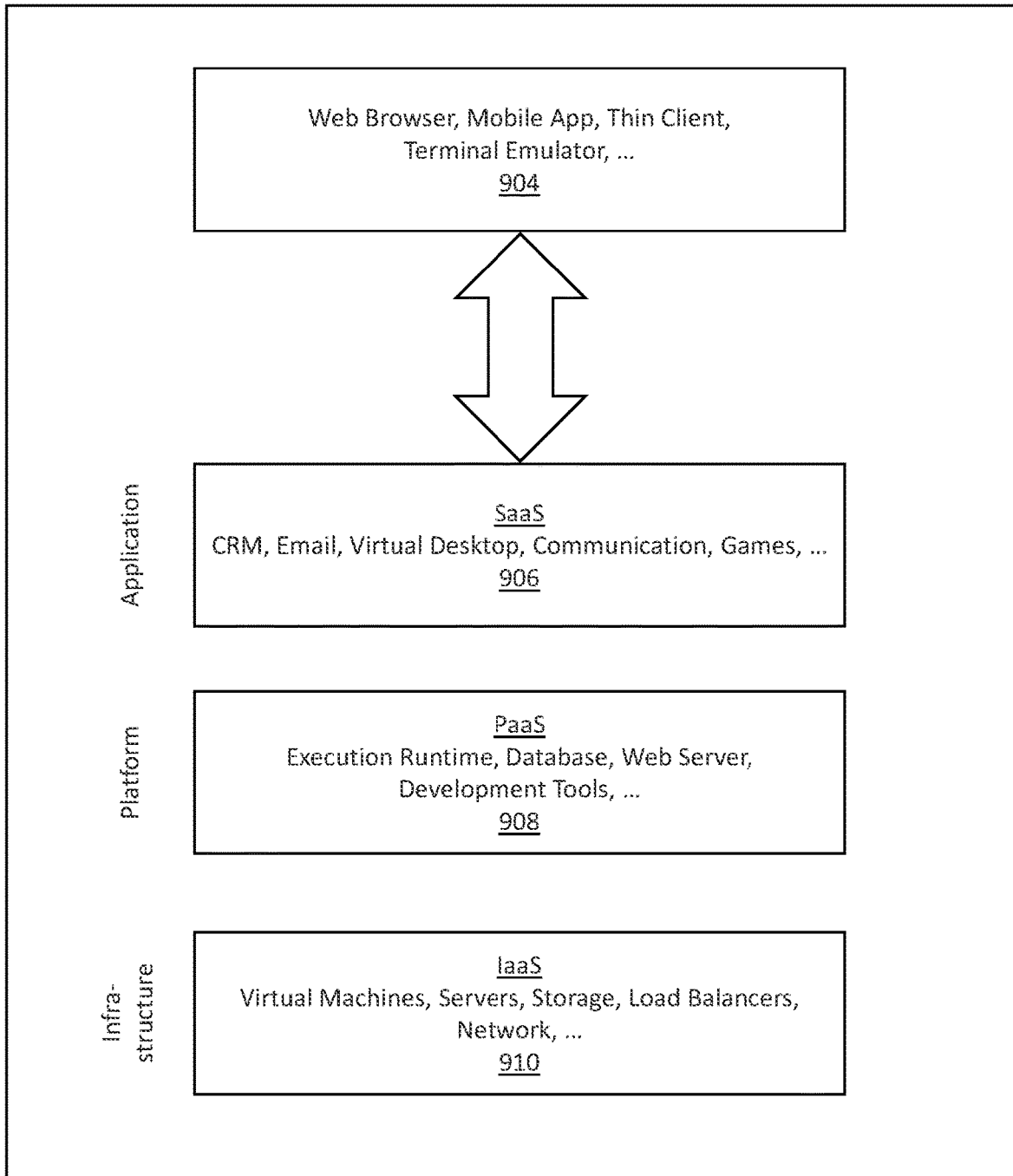

In some embodiments, the exemplary inventive computer-based systems/platforms, the exemplary inventive computer-based devices, and/or the exemplary inventive computer-based components of the present disclosure may be specifically configured to operate in a cloud computing/architecture 725 such as, but not limiting to: infrastructure a service (IaaS) 910, platform as a service (PaaS) 908, and/or software as a service (SaaS) 906 using a web browser, mobile app, thin client, terminal emulator or other endpoint 904. FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method comprising:
receiving, by at least one processor, an activity record comprising activity details associated with an account activity request in a user account;
wherein the activity details comprise an entity identifier;
determining, by the at least one processor, a flight booking associated with the activity record when the entity identifier comprises an airline;
determining, by the at least one processor, flight data associated with the flight booking, the flight data comprising a flight departure time;
automatically generating, by the at least one processor, a temporary offline token associated with the user account;
wherein the temporary offline token comprises account access restrictions;
wherein the account access restrictions comprise:
a temporary offline token activation period associated with the temporary offline token being active during a flight based on the flight departure time, and
a temporary offline token entity binding associated with the temporary offline token being bound to the airline for performing in-flight account activity requests with the airline during the temporary offline token activation period; and
automatically causing to download, by the at least one processor, the temporary offline token at a computing device to form an offline pre-approved payment device using the temporary offline token to perform the in-flight account activity requests with the entity during the temporary offline token activation period.

Clause 2. A method comprising:
receiving, by at least one processor, an activity record comprising activity details associated with an account activity request in a user account;
wherein the activity details comprise a flight number;
determining, by the at least one processor, flight data associated with the flight number, the flight data comprising:
i) a flight departure time indicator associated with a flight departure time,
ii) a flight arrival time indicator associated a flight arrival time at a destination, and
iii) an airline identifier identifying an airline operating a flight associated with the flight number;

automatically generating, by the at least one processor, a temporary offline token associated with the user account;
　wherein the temporary offline token comprises account access restrictions;
　wherein the account access restrictions comprise:
　　a temporary offline token activation period associated with the temporary offline token being active during a flight based on the flight departure time and the flight arrival time; and
automatically causing to download, by the at least one processor, the temporary offline token at a computing device to form an offline pre-approved account activity device using the temporary offline token to perform in-flight account activity requests during the temporary offline token activation period.

Clause 3. A system comprising:
　at least one processor in communication with a user account, wherein the at least one processor is configured to implement software instructions causing the at least one processor to perform steps to:
　　receive an activity record comprising activity details associated with an account activity request in the user account;
　　　wherein the activity details comprise an entity identifier;
　　determine a flight booking associated with the activity record when the entity identifier comprises an airline;
　　determine flight data associated with the flight booking, the flight data comprising a flight departure time;
　　automatically generate a temporary offline token associated with the user account;
　　　wherein the temporary offline token comprises account access restrictions;
　　　wherein the account access restrictions comprise:
　　　　a temporary offline token activation period associated with the temporary offline token being active during a flight based on the flight departure time, and
　　　　a temporary offline token entity binding associated with the temporary offline token being bound to the airline for performing in-flight account activity requests with the airline during the temporary offline token activation period; and
　　automatically cause to download the temporary offline token at a computing device to form an offline pre-approved account activity device using the temporary offline token to perform the in-flight account activity requests with the entity during the temporary offline token activation period.

Clause 4. The systems and methods of clauses 1, 2 or 3, further comprising:
　receiving, by the at least one processor, enhanced activity details associated with the activity record;
　　wherein the enhanced activity details comprise additional flight data comprising flight departure data associated with a flight departure airport; and
　determining, by the at least one processor, the temporary offline token activation period to be the duration of each flight of the flight booking.

Clause 5. The systems and methods of clauses 1, 2 or 3, further comprising:
　receiving, by the at least one processor, enhanced activity details associated with the activity record;
　　wherein the enhanced activity details comprise additional flight data comprising flight departure data associated with a flight departure airport;
　receiving, by the at least one processor, a geolocation associated with the computing device; and
　determining, by the at least one processor, the temporary offline token activation period to begin upon the geolocation matching the flight departure airport.

Clause 6. The systems and methods of clauses 1, 2 or 3, further comprising:
　receiving, by the at least one processor, enhanced activity details associated with the activity record;
　　wherein the enhanced activity details comprise additional flight data comprising flight destination data associated with a flight destination airport;
　receiving, by the at least one processor, a geolocation associated with the computing device; and
　determining, by the at least one processor, the temporary offline token activation period to end upon the geolocation matching the flight destination airport.

Clause 7. The systems and methods of clauses 1, 2 or 3, further comprising:
　receiving, by the at least one processor, enhanced activity details associated with the activity record;
　　wherein the enhanced activity details comprise additional flight data comprising layover data associated with one or more layover airports;
　generating, by the at least one processor, an update to the temporary offline token to comprise a new temporary offline token entity binding associated with one or more entities or entity categories of the one or more layover airports.

Clause 8. The systems and methods of clauses 1, 2 or 3, further comprising determining, by the at least one processor, an activation state of the temporary offline token based at least in part on an online access setting of the computing device.

Clause 9. The systems and methods of clause 8, wherein the temporary offline token is in an inactive state when the computing device has the online access setting set to an online state associated with the computing device having access to the Internet.

Clause 10. The systems and methods of clause 8, wherein the temporary offline token is in an active state when the computing device has the online access setting set to an offline state associated with the computing device having no access to the Internet.

Clause 11. The systems and methods of clause 8, further comprising:
　sending, by the at least one processor, a ping to the computing device; and
　determining, by the at least one processor, the online access setting of the computing device based on whether a response to the ping is received.

Clause 12. The systems and methods of clauses 1, 2 or 3, wherein the temporary offline token comprises a virtual credit card number representing a temporary virtual credit card associated with the user account.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:
receiving, by at least one hardware processor, a transaction record comprising transaction details associated with a transaction in a user account of a user;
wherein the transaction details comprise an entity identifier associated with an entity;
wherein the user account is associated with a computing device, configured to facilitate executing transactions with at least one point-of-sale device;
determining, by the at least one hardware processor, a scheduled transaction-related activity between the user and the entity based at least in part on the entity identifier of the transaction details of the transaction record;
wherein the scheduled transaction-related activity is indicative of at least one potential subsequent offline transaction between the user account and the entity;
determining, by the at least one hardware processor, transaction-related activity data associated with the scheduled transaction-related activity utilizing a data enrichment engine, the transaction-related activity data comprising a transaction-related activity start time;
automatically generating, by the at least one hardware processor, in response to the transaction-related activity data, a temporary, entity-specific, offline limited-use token associated with the user account for the at least one potential subsequent offline transaction associated with the scheduled transaction-related activity;
wherein the temporary, entity-specific, offline limited-use token comprises at least one account access restriction that restricts the use of the temporary, entity-specific, offline limited-use token to the scheduled transaction-related activity;
wherein the at least one account access restriction identifies:
a temporary, entity-specific, offline token activation period, identifying an active offline time period of the temporary, entity-specific, offline limited-use token based on the transaction-related activity start time, and
a token entity binding, identifying the entity to which the temporary, entity-specific, offline limited-use token being bound to during the token activation period; and
automatically causing, by the at least one hardware processor, to download the temporary, entity-specific, offline limited-use token to the computing device;
wherein the computing device is configured to communicate the temporary, entity-specific, offline limited-use token to the at least one point-of-sale device that executes at least one subsequent offline transaction request while the computing device is offline during the temporary offline token activation period and restricted to the entity.

2. The method of claim 1, further comprising:
receiving, by the at least one hardware processor, enhanced transaction details associated with the transaction record;
wherein the enhanced transaction details comprise additional transaction-related activity data comprising transaction-related activity start time data associated with a beginning of the transaction-related activity; and
determining, by the at least one hardware processor, the temporary offline limited-use token activation period to be a duration of transaction-related activity.

3. The method of claim 1, further comprising:
receiving, by the at least one hardware processor, enhanced transaction-related activity details associated with the transaction record;
wherein the enhanced transaction-related activity details comprise additional transaction-related activity data comprising transaction-related activity location data associated with a transaction-related activity location;
receiving, by the at least one hardware processor, a geolocation associated with the computing device; and
determining, by the at least one hardware processor, the temporary offline limited-use token activation period to begin upon the geolocation matching the transaction-related activity location.

4. The method of claim 1, further comprising:
receiving, by the at least one hardware processor, enhanced transaction details associated with the transaction record;
wherein the enhanced transaction details comprise additional transaction-related activity data comprising transaction-related activity end location data associated with a transaction-related activity end location;
receiving, by the at least one hardware processor, a geolocation associated with the computing device; and
determining, by the at least one hardware processor, the temporary offline limited-use token activation period to end upon the geolocation matching the transaction-related activity end location.

5. The method of claim 1, wherein the transaction-related activity comprises a flight and the transaction-related activity data comprises flight data.

6. The method of claim 5, further comprising:
receiving, by the at least one hardware processor, enhanced transaction details associated with the transaction record;
wherein the enhanced transaction details comprise additional flight data comprising layover data associated with one or more layover airports; and
generating, by the at least one hardware processor, an update to the temporary offline limited-use token to comprise a new temporary offline limited-use token entity binding associated with one or more entities or entity categories of the one or more layover airports.

7. The method of claim 1, further comprising determining, by the at least one hardware processor, an activation state of the temporary offline limited-use token based at least in part on an online access setting of the computing device.

8. The method of claim 7, wherein the temporary offline limited-use token is in an inactive state when the computing device has the online access setting set to an online state associated with the computing device having access to the Internet.

9. The method of claim 7, wherein the temporary offline limited-use token is in an active state when the computing device has the online access setting set to an offline state associated with the computing device having no access to the Internet.

10. The method of claim 7, further comprising:
sending, by the at least one hardware processor, a ping to the computing device; and
determining, by the at least one hardware processor, the online access setting of the computing device based on whether a response to the ping is received.

11. The method of claim 1, wherein the temporary offline limited-use token comprises a virtual credit card number representing a temporary virtual credit card associated with the user account.

12. A method comprising:
receiving, by at least one hardware processor, a transaction record comprising transaction details associated with a transaction activity in a user account of a user;
wherein the transaction details comprise an activity reference number;
wherein the user account is associated with a computing device, configured to facilitate executing transactions with at least one point-of-sale device;
determining, by the at least one hardware processor, scheduled transaction-related activity data associated with the activity reference number, the scheduled transaction-related activity data comprising:
i) a transaction-related activity start time indicator associated with a transaction-related activity start time,
ii) a transaction-related activity end time indicator associated a transaction-related activity end time, and
iii) an entity identifier identifying an entity associated with the activity reference number;
wherein the transaction-related activity is indicative of at least one potential subsequent offline transaction between the user account and the entity;
automatically generating, by the at least one hardware processor, in response to the transaction-related activity data, a temporary, entity-specific, offline limited-use token associated with the user account for the at least one potential subsequent offline transaction associated with the scheduled transaction-related activity;
wherein the temporary, entity-specific, offline limited-use token comprises at least one account access restriction that restricts the use of the temporary, entity-specific, offline limited-use token to the scheduled transaction-related activity;
wherein the account access restrictions comprise:
a temporary, entity-specific, offline limited-use token activation period associated with the temporary, entity-specific, offline limited-use token being active during the scheduled transaction-related activity based on the transaction-related activity data; and
automatically causing, by the at least one hardware processor, to download the temporary, entity-specific, offline limited-use token to the computing device;
wherein the computing device is configured to communicate the temporary, entity-specific, offline limited-use token to the at least one point-of-sale device of that executes at least one subsequent offline transaction request while the computing device is offline during the temporary offline token activation period and restricted to the entity.

13. The method of claim 12, further comprising:
wherein the transaction details are associated with a flight number;
wherein the transaction-related activity start time indicator is associated with a flight departure time; and
determining, by the at least one hardware processor, the temporary offline limited-use token activation period to be a duration of a flight associated with the flight number starting at the flight departure time.

14. The method of claim 12, further comprising:
wherein the transaction details are associated with a flight number;
receiving, by the at least one hardware processor, additional flight data comprising flight departure data associated with a flight departure airport;
receiving, by the at least one hardware processor, a geolocation associated with the computing device; and
determining, by the at least one hardware processor, the temporary offline limited-use token activation period to begin upon the geolocation matching the flight departure airport.

15. The method of claim 12, further comprising:
wherein the transaction details are associated with a flight number;
receiving, by the at least one hardware processor, additional flight data comprising flight destination data associated with a flight destination airport;
receiving, by the at least one hardware processor, a geolocation associated with the computing device; and
determining, by the at least one hardware processor, the temporary offline limited-use token activation period to end upon the geolocation matching the flight destination airport.

16. The method of claim 12, further comprising:
wherein the transaction details are associated with a flight number;
receiving, by the at least one hardware processor, additional flight data comprising layover data associated with one or more layover airports; and
generating, by the at least one hardware processor, an update to the temporary offline limited-use token to comprise a new temporary offline limited-use token entity binding associated with one or more entities or entity categories of the one or more layover airports.

17. The method of claim 12, further comprising determining, by the at least one hardware processor, an activation state of the temporary offline limited-use token based at least in part on an online access setting of the computing device.

18. The method of claim 17, wherein the temporary offline limited-use token is in an inactive state when the computing device has the online access setting set to an online state associated with the computing device having access to the Internet.

19. The method of claim 17, further comprising:
sending, by the at least one hardware processor, a ping to the computing device; and
determining, by the at least one hardware processor, the online access setting of the computing device based on whether a response to the ping is received.

20. A system comprising:
at least one processor in communication with a user account, wherein the at least one processor is configured to implement software instructions causing the at least one processor to perform steps to:
receive a transaction record comprising transaction details associated with a transaction in a user account of a user;
wherein the transaction details comprise an entity identifier associated with an entity;
wherein the user account is associated with a computing device, configured to facilitate executing transactions with at least one point-of-sale device;

determine scheduled transaction-related activity between the user and the entity based at least in part on the entity identifier of the transaction details of the transaction record;
  wherein the scheduled transaction-related activity is indicative of at least one potential subsequent offline transaction between the user account and the entity;
determine transaction-related activity data associated with the scheduled transaction-related activity utilizing a data enrichment engine, the transaction-related activity data comprising a transaction-related activity start time;
automatically generate, in response to the transaction-related activity data, a temporary, entity-specific, offline limited-use token associated with the user account for the at least one potential subsequent offline transaction associated with the scheduled transaction-related activity;
  wherein the temporary, entity-specific, offline limited-use token comprises at least one account access restriction that restricts the use of the temporary, entity-specific, offline limited-use token to the scheduled transaction-related activity;
  wherein the at least one account access restriction identifies:
    a temporary, entity-specific, offline token activation period, identifying an active offline time period of the temporary, entity-specific, offline limited-use token based on the transaction-related activity start time, and
    a token entity binding, identifying the entity to which the temporary, entity-specific, offline limited-use token being bound to during the token activation period; and
automatically cause to download the temporary, entity-specific, offline limited-use token to the computing device;
  wherein the computing device is configured to communicate the temporary, entity-specific, offline limited-use token to the at least one point-of-sale device that executes at least one subsequent offline transaction request while the computing device is offline during the temporary offline token activation period and restricted to the entity.

* * * * *